United States Patent
Yoshida et al.

(10) Patent No.: US 11,712,823 B2
(45) Date of Patent: Aug. 1, 2023

(54) MOLDING DIE FOR COMPRESSION MOLDING WITH RESIN LEAKAGE PREVENTION MEMBER

(71) Applicant: TOWA CORPORATION, Kyoto (JP)

(72) Inventors: Yusuke Yoshida, Kyoto (JP); Yohei Onishi, Kyoto (JP)

(73) Assignee: TOWA CORPORATION, Kyoto (JP)

( * ) Notice: Subject to any disclaimer, the term of this patent is extended or adjusted under 35 U.S.C. 154(b) by 0 days.

(21) Appl. No.: 17/408,389

(22) Filed: Aug. 21, 2021

(65) Prior Publication Data
US 2022/0063151 A1  Mar. 3, 2022

(30) Foreign Application Priority Data
Aug. 26, 2020  (JP) ................. 2020-143050

(51) Int. Cl.
*B29C 43/36* (2006.01)

(52) U.S. Cl.
CPC .. *B29C 43/3607* (2013.01); *B29C 2043/3652* (2013.01); *B29C 2043/3665* (2013.01)

(58) Field of Classification Search
CPC . B29C 43/3607; B29C 33/0038; B29C 33/50; B29C 33/68; B29C 33/565; B29C 2045/14663
See application file for complete search history.

(56) References Cited

U.S. PATENT DOCUMENTS 3,833,228 A * 9/1974 Gilliam, Sr. ............. F16J 15/20
                                                     277/530
3,833,699 A * 9/1974 Stefanka ............... B29C 33/505
                                                     264/534

(Continued)

FOREIGN PATENT DOCUMENTS

JP  H02-9612 A    1/1990
JP  H08-118382 A  5/1996

(Continued)

OTHER PUBLICATIONS

Office Action of the corresponding Taiwanese Patent Application No. 110127615 dated Apr. 13, 2022 and partial English translation thereof.

(Continued)

*Primary Examiner* — Matthew J Daniels
(74) *Attorney, Agent, or Firm* — Muncy, Geissler, Olds & Lowe, P.C.

(57) ABSTRACT

The present invention provides a resin leakage prevention member 401 for use in a molding die 1000, wherein the molding die 1000 includes a lower die 200 and an upper die 100, the lower die 200 has a side member 201 and a bottom member 202, a space surrounded by the side member 201 and the bottom member 202 forms a cavity 204, the cavity 204 is configured to accommodate a resin material 20*a*, the side member 201 is configured to move relatively vertical to the bottom member 202, and the resin leakage prevention member 401 is disposed on a peripheral portion of an upper surface of the bottom member 202 and along an inner peripheral surface of the side member 201, thereby sealing a gap between the side member 201 and the bottom member 202 and preventing a resin from leaking from the cavity 204 into the gap.

9 Claims, 7 Drawing Sheets

(56) References Cited

U.S. PATENT DOCUMENTS

| | | | | | |
|---|---|---|---|---|---|
| 4,033,400 | A | * | 7/1977 | Gurwell | C04B 41/009 |
| | | | | | 164/120 |
| 4,116,451 | A | * | 9/1978 | Nixon | F16J 15/30 |
| | | | | | 277/530 |
| 4,946,640 | A | * | 8/1990 | Nathoo | B29C 51/082 |
| | | | | | 264/510 |
| 5,648,132 | A | * | 7/1997 | Abe | H01B 19/00 |
| | | | | | 264/328.8 |
| 9,831,104 | B1 | * | 11/2017 | Kwon | H01L 23/3142 |

FOREIGN PATENT DOCUMENTS

| | | | |
|---|---|---|---|
| JP | H9-239787 | A | 9/1997 |
| JP | 3634261 | B2 | 3/2005 |
| JP | 3790488 | B2 | 6/2006 |
| JP | 2017-035832 | A | 2/2017 |
| KR | 10-2018-0110584 | A | 10/2018 |
| KR | 1020190090778 | A | 8/2019 |
| TW | 201714724 | A | 5/2017 |
| TW | I623068 | B | 5/2018 |

OTHER PUBLICATIONS

Office Action of the corresponding Korean Patent Application No. 10-2021-0100206 dated Nov. 1, 2022 and English translation thereof.
Written Decision on Registration of the corresponding Korean Patent Application No. 10-2021-0100206 dated Feb. 7, 2023 and English translation thereof.

\* cited by examiner

MOLDING DIE FOR COMPRESSION MOLDING WITH RESIN LEAKAGE PREVENTION MEMBER

TECHNICAL FIELD

The present invention relates to a resin leakage prevention member, a resin leakage prevention member supply mechanism, a resin molding apparatus, and a method for producing a resin molded product.

BACKGROUND ART

In the production of a resin molded product, compression molding using a molding die may be used (JPH9(1997)-239787, etc.).

SUMMARY OF INVENTION

Technical Problem

In compression molding, a phenomenon that a resin enters into a gap of a molding die (resin leakage) may occur. When this resin leakage occurs, there is a problem that cleaning for removing the resin entered into the gap of the molding die is frequently required, for example. In order to prevent the resin from leaking, there is a method for covering the die surface of the molding die with a release film.

However, when a release film is used, problems that the release film cannot be stretched to fit the die surface of the molding die without wrinkling, the stretched release film becomes torn, the stretched release film becomes wrinkled and enters into the package surface (the surface of the resin molded product) at the time of clamping, and the like may occur. These problems may occur particularly when the die cavity of the molding die is deep.

With the foregoing in mind, it is an object of the present invention to provide a resin leakage prevention member, a resin leakage prevention member supply mechanism, a resin molding apparatus, and a method for producing a resin molded product that is configured to prevent resin leakage without using a release film.

Solution to Problem

In order to achieve the above object, the present invention provides a resin leakage prevention member for use in a molding die for compression molding, wherein the molding die includes a lower die and an upper die, the lower die has a side member and a bottom member, a space surrounded by the side member and the bottom member forms a cavity, the cavity is configured to accommodate a resin material, the side member is configured to move relatively vertical to the bottom member, and the resin leakage prevention member is disposed on a peripheral portion of the bottom member and along an inner peripheral surface of the side member, thereby sealing a gap between the side member and the bottom member and preventing a resin from leaking from the cavity into the gap.

The present invention also provides a resin leakage prevention member supply mechanism that supplies the resin leakage prevention member according to the present invention.

The present invention also provides a resin molding apparatus, including: a molding die for compression molding; and the resin leakage prevention member supply mechanism according to the present invention, wherein the molding die includes a lower die and an upper die, the lower die has a side member and a bottom member, a space surrounded by the side member and the bottom member forms a cavity, the cavity is configured to accommodate a resin material, and the side member is configured to move relatively vertical to the bottom member.

The present invention also provides a method for producing a resin molded product using a molding die for compression molding and the resin leakage prevention member according to the present invention, wherein the molding die includes a lower die and an upper die, the lower die has a side member and a bottom member, a space surrounded by the side member and the bottom member forms a cavity, the cavity is configured to accommodate a resin material, the side member is configured to move relatively vertical to the bottom member, and the method includes the steps of: disposing the resin leakage prevention member along an inner peripheral surface of the side member, thereby sealing a gap between the side member and the bottom member and preventing a resin from leaking from the cavity into the gap; supplying the resin material into the cavity after the resin leakage prevention member disposing, and performing resin molding by compression molding using the molding die after the resin material supplying.

DESCRIPTION OF EMBODIMENTS

Figure 1A:
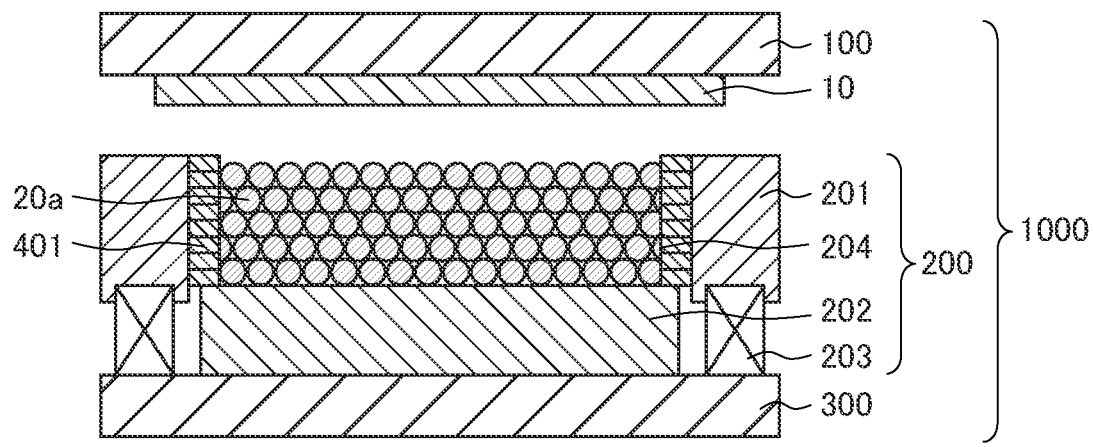
FIGS. 1A and 1B show process cross-sectional views illustrating an example of a resin leakage prevention member of the present invention and a production method of a resin molded product using the same in a resin molding apparatus.

The present invention is described in more detail below with reference to examples. The present invention, however, is not limited by the following description.

The resin leakage prevention member of the present invention may be formed of, for example, at least one material selected from the group consisting of paper, resins, and rubbers. These materials may be used in combination as a composite material, or a surface treating material (laminate material, coating material, applying material, painting material, impregnating material, etc.) obtained by being surface-treated with these materials may be used, for example.

The resin leakage prevention member of the present invention may be formed of, for example, a contractable material.

The resin leakage prevention member of the present invention may be divided into a plurality of members, and the plurality of members may be stacked to use, for example.

The resin leakage prevention member of the present invention may be used, for example, in the form of a sheet or a film. In general, a member having a relatively large thickness may be referred to as a "sheet" and a member having a relatively small thickness may be referred to as a "film". The thickness of the resin leakage prevention member of the present invention is not particularly limited.

A recessed portion may be formed in a peripheral portion of an upper end of the bottom member, and the resin leakage prevention member of the present invention may be inserted into the recessed portion to use. In this specification, the term "on the peripheral portion of the bottom member" includes not only the case in which the resin leakage prevention member is in contact with the upper surface of the peripheral portion of the bottom member, but also the case in which the resin leakage prevention member is positioned above the upper surface of the peripheral portion of the bottom member (the case in which the resin leakage prevention member is not in contact with the upper surface of the peripheral portion of the bottom member). The case in which the resin leakage prevention member is in contact with the upper surface of the peripheral portion of the bottom member means, for example, the case in which the resin leakage prevention member of the present invention is placed on the upper surface of the peripheral portion of the bottom member to use. The case in which the resin leakage prevention member is positioned above the upper surface of the peripheral portion of the bottom member (the case in which the resin leakage prevention member is not in contact with the upper surface of the peripheral portion of the bottom member) means, for example, as described above, the case in which a recessed portion is formed in the peripheral portion of the upper end of the bottom member, and the resin leakage prevention member of the present invention is inserted into the recessed portion to use.

As described above, the resin leakage prevention member of the present invention is a resin leakage prevention member for use in a molding die for compression molding, wherein the molding die includes a lower die and an upper die.

In the present invention, compression molding is used as the resin molding method as described above.

In the present invention, the "molding die" is, for example, a metal die, but is not limited thereto, and may be, for example, a ceramic die or the like.

In the present invention, a resin molded product is not particularly limited, and may be, for example, a resin molded product obtained by simply molding a resin or a resin molded product obtained by resin encapsulating a component such as a chip. In the present invention, a resin molded product may be, for example, an electronic component or the like. The electronic component is not particularly limited, and may be any electronic component being any component such as a chip or a wire encapsulated in a resin. There is no particular limitation on the type, form, and the like of the chip, and may be, for example, at least one of the various forms (including flip chip) described above.

In the present invention, a resin material before molding and a resin after molding are not particularly limited, and may be, for example, a thermosetting resin such as an epoxy resin or a silicone resin, or a thermoplastic resin. Further, the resin material before molding and the resin after molding may be a composite material containing a thermosetting resin or a thermoplastic resin in a part. In the present invention, the resin material before molding may be in the form of, for example, a granular resin, a liquid resin, a sheet-like resin, a tablet-like resin, a powder-like resin, or the like. Note that, in the present invention, the liquid resin may be liquid at ordinary temperature, or the liquid resin may also include a molten resin which is to be melted by heating to become liquid.

The "electronic component" can refer to a chip before resin encapsulation or a resin encapsulated chip. However, a mere "electronic component" in the present invention refers to an electronic component being the chip or the like encapsulated in a resin (a completed electronic component), unless otherwise mentioned. In the present invention, a "chip" refers to a chip before resin encapsulation and can be, for example, specifically an IC, an LED chip, a semiconductor chip, or a chip such as a semiconductor element for power control. In the present invention, a chip before resin encapsulation is referred to as a "chip" as a matter of convenience in order to differentiate from an electronic component after resin encapsulation. However, the "chip" in the present invention is only required to be an electronic component before resin encapsulation and is not limited to particular electronic components and may not be a chip-like electronic component.

In the present invention, a "flip chip" means an IC chip having a bump-like protruding electrode called a bump on an electrode (bonding pad) on the front surface of the IC chip, or such a chip form. This chip is connected to a wiring portion such as a printed circuit board in a downward direction (face-down). The flip chip is used, for example, as one of a chip for wireless bonding or a connecting method.

In the present invention, an object to be resin molded is not particularly limited, and may be, for example, a substrate. In the present invention, for example, a part (e.g., a chip, a flip-chip, or the like) mounted on a substrate (object to be molded) may be resin encapsulated (resin molded) to produce a resin molded product. In the present invention, a substrate (also referred to as interposer), which is an object to be resin molded, is not particularly limited, and examples thereof include a lead frame, a wiring substrate, a wafer, a glass epoxy substrate, a ceramic substrate, a resin substrate, and a metal substrate. The substrate may be, for example, a mounting substrate on one or both sides of which chips are mounted. The method for mounting the chip is not particularly limited, and examples thereof include wire bonding and flip-chip bonding. In the present invention, for example, an electronic component being the chip encapsulated in a resin may be produced by resin encapsulating a mounting substrate. The use of a substrate to be resin encapsulated by the resin encapsulation apparatus of the present invention is not particularly limited, and examples thereof include a substrate for LEDs, a high-frequency module substrate for portable communication terminals, a module substrate for power control, and a substrate for device control.

Examples of the present invention will be described below with reference to the drawings. Each drawing is schematically illustrated by appropriately omitting, exaggerating, and the like for convenience of description.

Example 1

In the present example, an example of a resin molding apparatus and a production method of a resin molded product of the present invention will be described.

Figure 1B:
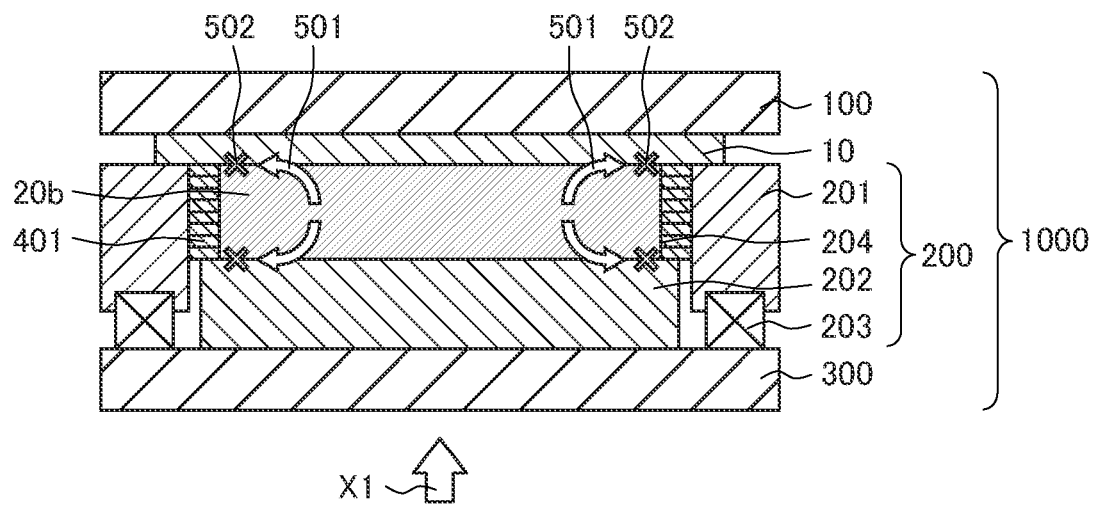

FIGS. 1A and 1B show process cross-sectional views illustrating an example of a resin leakage prevention member of the present invention and a production method of a resin molded product using the same in a resin molding apparatus. As shown in FIG. 1A, the molding die 1000 includes an upper die 100 and a lower die 200. The lower die 200 has a side member 201 and a bottom member 202. The side member 201 is disposed so as to surround the bottom member 202. A space surrounded by the side member 201 and the bottom member 202 forms a cavity 204. As shown in FIGS. 1A and 1B, the cavity 204 is configured to accommodate resin materials 20a. While the resin material 20a is a granular resin in FIG. 1A, the form of the resin material before molding is not particularly limited in the present invention. The resin material 20a may be a granular resin as described above, or may be a liquid resin, a sheet-like resin, a tablet-like resin, a powdery resin, or the like.

The side member 201 and the bottom member 202 are disposed on a lower die base member 300. The bottom member 202 is directly fixed to the upper surface of the lower die base member 300. The side member 201 is attached to the upper surface of the lower base member 300 through an elastic member 203. The side member 201 is configured move vertically by expansion and contraction of the elastic member 203. A clamping mechanism (not shown) is provided below the lower base member 300, and this clamping mechanism allows the lower base member 300 to be elevated and lowered.

As shown in FIGS. 1A and 1B, a substrate (object to be molded) 10 can be attached to the lower surface of the upper die 100. The upper die 100 is provided in the fixed upper die base member (not shown) disposed above the upper die 100.

Figure 2:
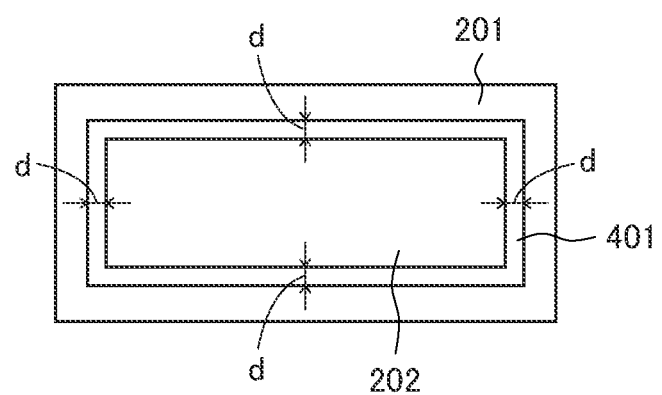
FIG. 2 is a plan view illustrating an example of the lower die and the resin leakage prevention member of FIG. 1.

As shown in FIG. 2, in planar view, a resin leakage prevention member 401 is in a shape obtained by hollowing out, from a rectangle having substantially the same size as the cavity, a rectangle reduced by a width d from each side of the rectangle. Further, as shown in FIGS. 1A, 1B, and 2, the resin leakage prevention member 401 is disposed on the peripheral portion of the bottom member 202 and along the inner peripheral surface of the side member 201. The resin leakage prevention member 401 in the present example is divided into a plurality of members (seven in FIG. 1), and these members are stacked to use as shown in the cross-sectional view of FIGS. 1A and 1B. While the number of the plurality of members in the resin leakage prevention member 401 is seven in FIGS. 1A and 1B, the number is not limited thereto and can be set appropriately. The resin leakage prevention member 401 can seal the gap between the side member 201 and the bottom member 202. As a result, the resin can be prevented from leaking from the inside of the cavity 204 into the gap between the side member 201 and the bottom member 202. The material of the resin leakage prevention member 401 is not particularly limited, and may be, for example, paper, resins, rubbers, and the like as described above, and a composite material thereof, a surface treating material thereof (laminate material, coating material, applying material, painting material, impregnating material, etc.), or the like may be used.

FIG. 2 is a plan view illustrating a state in which the resin leakage prevention member 401 is disposed along the inner peripheral surface of the side member 201 as shown in FIG. 1A. In FIG. 2, the upper die 100, a substrate 10, and the resin material 20a are not shown. As shown in FIG. 2, by disposing the resin leakage prevention member 401 along the inner peripheral surface of the side member 201, the gap between the side member 201 and the bottom member 202 is sealed. Further, in FIG. 2, the upper surface of the bottom member 202 except for the peripheral portion is not covered with the resin leakage prevention member 401. However, the upper surface of the bottom member 202 other than the peripheral portion (cavity flat portion of the bottom member 202) may be covered with a cover for dirt prevention, die release force reduction (improvement of die release ease), or the like. This cover is not particularly limited, and may be formed of, for example, the same material as the resin leakage prevention member 401.

The resin molding apparatus of the present example includes a resin leakage prevention member supply mechanism (not shown) in addition to the molding die 1000. By this resin leakage prevention member supply mechanism, the resin leakage prevention member 401 is configured to be supplied to the molding die 1000.

The production method of a resin molded product using the molding die 1000 and the resin leakage prevention member 401 can be performed, for example, in the following manner. First, as shown in FIGS. 1A and 2, by disposing the resin leakage prevention member 401 on the peripheral portion of the upper surface of the bottom member 202 and along the inner peripheral surface of the side member 201, the gap between the side member 201 and the bottom member 202 is sealed. This prevents the resin supplied to the cavity 204 from entering into the gap between the side member 201 and the bottom member 202 from the inside of the cavity 204 (the resin leakage prevention member disposing). The method for performing the resin leakage prevention member 401 disposing is not particularly limited, and for example, the resin leakage prevention member may be disposed along the inner peripheral surface of the side member 201 after the resin leakage prevention member 401 is conveyed to the position of the cavity 204 by the above-described resin leakage prevention member supply mechanism (not shown). After the leakage prevention member disposing, as shown in FIG. 1A, the resin material 20a is supplied into the cavity 204 (the resin material supplying). The method for performing the resin material supplying is not particularly limited, and for example, the resin material 20a may be conveyed to the position of the cavity 204 by a resin material conveying mechanism (not shown), and then the resin material 20a may be supplied into the cavity 204. Further, after the resin material supplying, resin molding is performed by compression molding using the molding die 1000 (the resin molding). The method for performing the resin molding is not particularly limited, and may be the same as or according to, for example, the resin molding by general compression molding. Specifically, the resin molding can be performed, for example, in the following manner. First, the upper die 100 and the lower die 200 are heated, and the resin material 20a is melted by the heat to form a molten resin 20b. The upper die 100 and the lower die 200 may be heated in advance before the resin material supplying is performed (i.e., before the resin material 20a is supplied into the cavity 204). Next, as shown in FIG. 1B, by the clamping mechanism (not shown), the lower die base member 300 is elevated in the direction of the arrow Xl, and the upper die 100 and the lower die 200 are clamped. As a result, first, the substrate 10 held by the upper die 100 contacts the side member 201, and then the die is further clamped, whereby the elastic member 203 of the side member 201 contracts (FIG. 1B). By this clamping, as shown in FIG. 1B, the resin leakage prevention member 401 sandwiched between the substrate 10 and the bottom member 202 is pushed by the bottom member 202 and contracted. At this time, as shown by the arrow 501, even if the molten resin 20b is about to flow into the gap between the side member 201 and the bottom member 202 from the cavity 204, since the resin leakage preventing member 401, which is contracted and dense, is present on the inner peripheral surface of the cavity 204 from the upper surface of the gap to the level of the lower surface of the substrate, as indicated by the X mark 502, the molten resin 20b cannot flow into the gap (resin leakage does not occur). This is because the gap between the side member 201 and the bottom member 202 is sealed by the contracted and dense resin leakage prevention member 401. Thereafter, after curing (solidifying) the molten resin 20b into a cured resin, the lower die 200 is lowered to open the die, and a resin molded product which is the substrate 10 encapsulated in a resin is taken out from the molding die 1000. Thereafter, the resin leakage prevention member 401 adhering to the side surface of the cured resin part of the resin molded product is removed. At this time, the cured resin at the part being in contact with the resin leakage prevention member 401 may be removed by cutting, chipping, or the like. A resin molded product can be produced by performing the resin molding as described above. The method for curing the molten resin 20b is not particularly limited. For example, when the molten resin 20b is a thermosetting resin, the molten resin 20b may be cured by heating. When the molten resin 20b is a thermoplastic resin, the molten resin 20b may be cured by cooling or by natural cooling. While nothing is disposed on the surface of the substrate 10 in FIGS. 1A and 1B, a chip or the like may be disposed on the lower surface of the substrate 10, for example. Then, the chip or the like may be resin encapsulated (resin molded) in the resin molding to produce an electronic component (resin molded product) with the chip encapsulated in a resin.

In the lower die 200, the depth of the cavity 204 before clamping (the state in which the elastic member 203 is not contracted) is not particularly limited, and the depth may be, for example, 1 mm or more, 3 mm or more, 5 mm or more, or 10 mm or more, and may be, for example, 30 mm or less, 20 mm or less, 10 mm or less, 5 mm or less, or 3 mm or less. The depth of the cavity 204 after clamping (in the state of FIG. 1B) is not particularly limited, and the depth may be, for example, 1 mm or more, 3 mm or more, 5 mm or more, 10 mm or more, or 15 mm or more, and may be, for example, 20 mm or less, 10 mm or less, 5 mm or less, 3 mm or less, or 1 mm or less. The depth of the cavity 204 after clamping is substantially equal to the thickness of the resin molded product after molding.

The width d of the resin leakage prevention member 401 may be appropriately set depending on the size of the gap between the side member and the bottom member and the type of the resin material, and is not particularly limited. The width d may be, for example, 0.01 mm or more, 0.05 mm or more, 0.1 mm or more, 0.5 mm or more, or 1 mm or more, and may be, for example, 2 mm or less, 1 mm or less, 0.5 mm or less, 0.1 mm or less, or 0.05 mm or less, and may be, for example, about 1 to 2 mm.

The height of the resin leakage prevention member 401 as a whole may be appropriately set depending on the material of the resin leakage prevention member or the type of the resin material, and may be, for example, equal to or greater than the depth of the cavity 204 before clamping. The thickness (height) of the individual member in the resin leakage prevention member 401 is not particularly limited, and may be, for example, 1 mm or more, 3 mm or more, 5 mm or more, or 10 mm or more, and may be, for example, 30 mm or less, 20 mm or less, 10 mm or less, 5 mm or less, or 3 mm or less, and may be, for example, about 1 to 2 mm. For example, when the depth of the cavity 204 before clamping is 5 mm, five pieces of the member having a thickness of 1 mm may be stacked. It is preferable that the resin leakage prevention member 401 be contractible with a change in the depth of the cavity 204 before clamping at the time of clamping.

Figure 7:
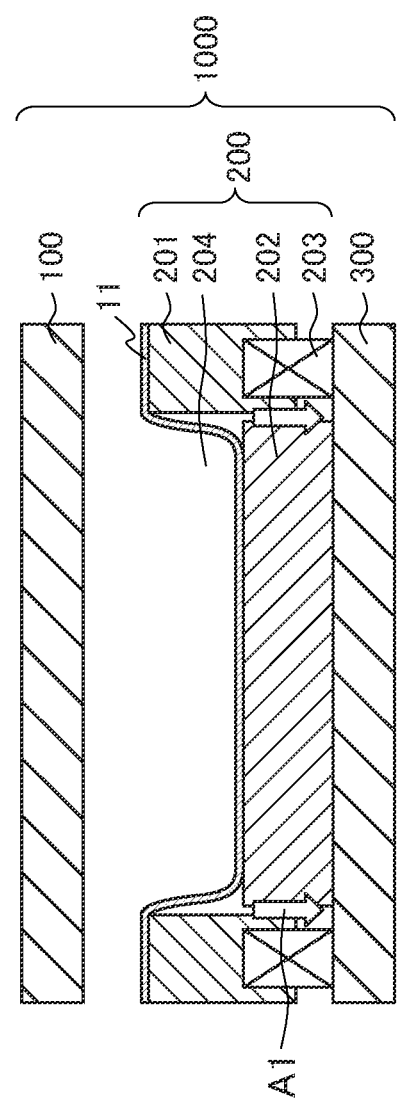
FIG. 7 is a process cross-sectional view illustrating an example of a production method of a resin molded product using a release film in a resin molding apparatus.

An example of using a release film is described with reference to FIG. 7. The molding die 1000 of FIG. 7 is the same as the molding die 1000 shown in FIGS. 1A and 1B. As shown in FIG. 7, a release film 11 can be used by being attracted to the die surface of the lower die 200. For example, as shown by the arrow A1 in FIG. 7, the release film 11 can be attracted to the die surface of the lower die 200 by a suction mechanism (not shown, e.g., vacuum pump) from a gap between the side member 201 and the bottom member 202 or a suction hole (not shown) formed in the lower die. Thus, by covering the die surface of the lower die 200 with the release film 11, the resin can be prevented from entering into the gap between the side member 201 and the bottom member 202 (i.e., resin leakage can be prevented). In addition, the releasability is improved.

As described above, when a release film is used, problems that the release film cannot be stretched to fit the die surface of the molding die without wrinkling, the stretched release film becomes torn, the stretched release film becomes wrinkled and enters into the package surface (the surface of the resin molded product), and the like may occur. These problems can occur particularly when the die cavity of the molding die is deep. However, if the resin leakage prevention member of the present invention is used instead of the release film, the resin leakage can be prevented without using a release film, so that these problems can be solved. Further, the use of the resin leakage prevention member of the present invention can prevent resin leakage, so that it can solve a problem that cleaning for removing the resin entered into the gap of the molding die is frequently required, for example.

The resin leakage prevention member of the present invention may be, for example, a reusable member or a disposable consumable member. From the viewpoint of working efficiency and the like in a production of resin molded products, it is preferable to use a disposable consumable member.

Since the resin leakage prevention member of the present invention does not need to be stretched to fit the die surface as a release film, it does not need to be as stretchable and flexible as a release film. As a result, the resin leakage prevention member of the present invention can employ a material that is cheaper than release film, for example, so that costs at the time of producing a resin molded product can be reduced. Further, since the resin leakage prevention member of the present invention does not need to be stretched like the release film, for example, problems that the stretched resin leakage prevention member becomes torn, the stretched resin leakage prevention member becomes wrinkled and enters into the package surface (the surface of the resin molded product), and the like may not occur.

The resin leakage prevention member can be used also by being sucked from a gap of a molding die as in the case of the release film. However, if the width d of the resin leakage prevention member of the present invention is sufficiently wide as compared with the width of the gap between the side member and the bottom member, resin leakage can be prevented by simply disposing the resin leakage prevention member on the peripheral portion of the upper surface of the bottom member without suction. In this manner, by using the resin leakage prevention member of the present invention, suction can be omitted unlike the release film, so that the producing efficiency of a resin molded product can be improved, and the configuration of a resin molding apparatus can be simplified (omission of release film suction mechanism).

The molding die for compression molding used in the present invention is not particularly limited, and, for example, the same molding die as a general molding die for compression molding can be used. Further, the resin molding apparatus of the present invention may be similar to a conventional resin molding apparatus for compression molding, except that it includes, for example, the resin leakage prevention member supply mechanism. A general resin molding apparatus for compression molding includes, for example, an apparatus described in JP2017-035832 A.

Example 2

In the present example, another example of a resin molding apparatus and a production method of a resin molded product of the present invention will be described.

Figure 3A:
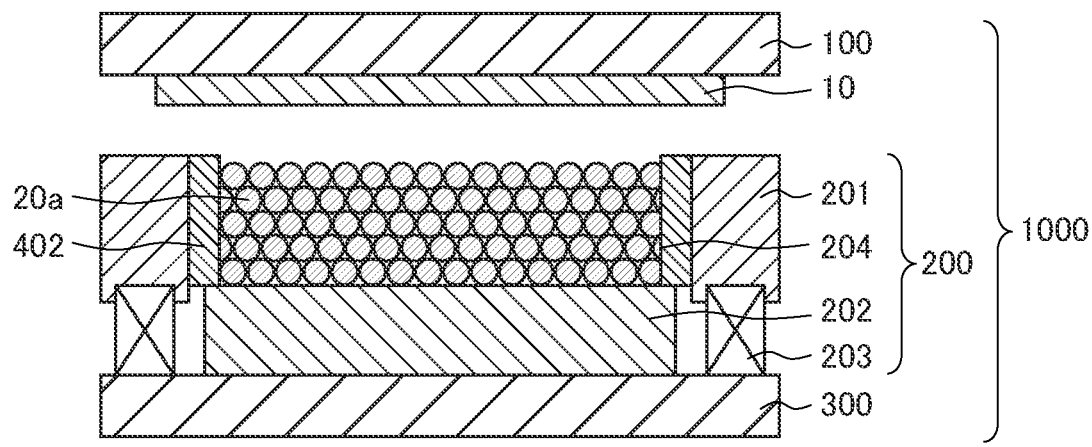
FIGS. 3A and 3B show process cross-sectional views illustrating another example of a resin leakage prevention member of the present invention and a production method of a resin molded product using the same in a resin molding apparatus.
Figure 3B:
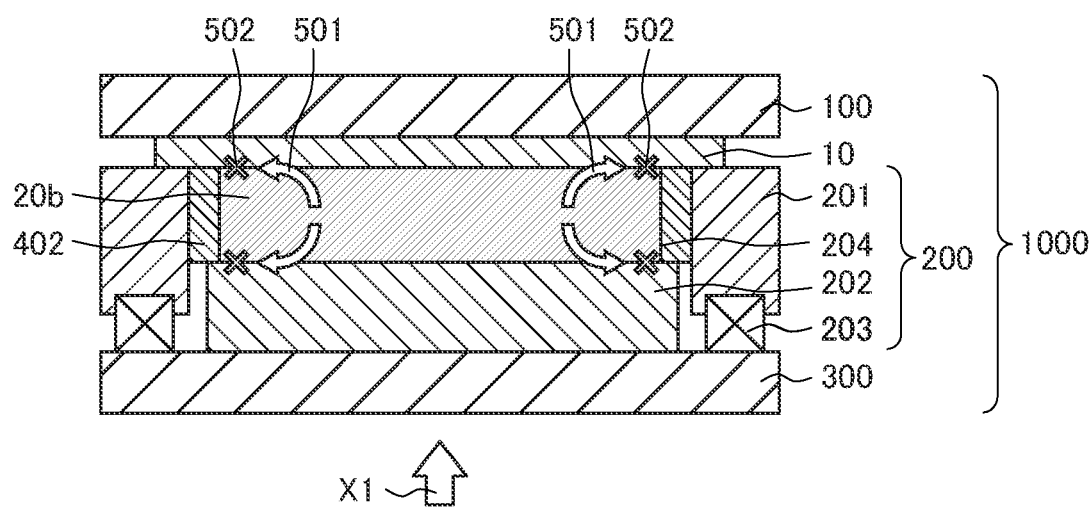

FIGS. 3A and 3B show process cross-sectional views illustrating another example of a resin leakage prevention member of the present invention and a production method of a resin molded product using the same in a resin molding apparatus.

FIGS. 3A and 3B are the same as FIGS. 1A and 1B, except that the resin leakage prevention member 402 is used instead of a resin leakage prevention member 401. As shown in FIGS. 3A and 3B, the resin leakage prevention member 402 is in the form of a sheet and is placed upright on (propped against) the peripheral portion of the upper surface of the bottom member 202. That is, the sheet-like resin leakage prevention member 402 is stretched around the entire side surface of the cavity. Thus, as shown in FIGS. 3A and 3B, the resin leakage prevention member 402 can be disposed along the inner peripheral surface of the side member 201, thereby sealing the gap between the side member 201 and the bottom member 202. The material of the resin leakage prevention member 402 is not particularly limited, and may be, for example, paper, resins, rubbers, or the like as described above, and a composite material thereof, a surface treating material thereof (laminate material, coating material, applying material, painting material, impregnating material, etc.) or the like may be used. The size (width and height) of the resin leakage prevention member 402 is not particularly limited, and may be the same as that of the resin leakage prevention member 401 of Example 1, for example.

Figure 4A:
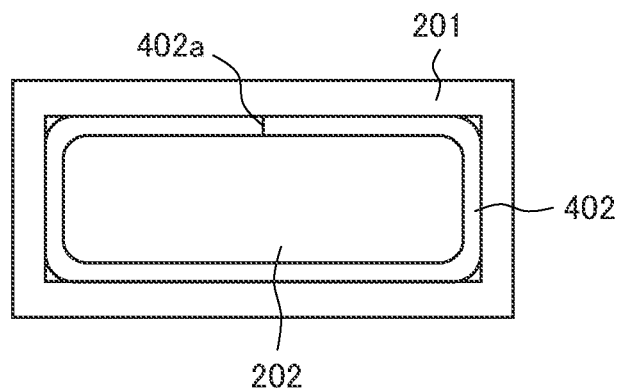
FIG. 4A is a plan view illustrating an example of the lower die and the resin leakage prevention member of FIGS. 3A and 3B.
Figure 4B:
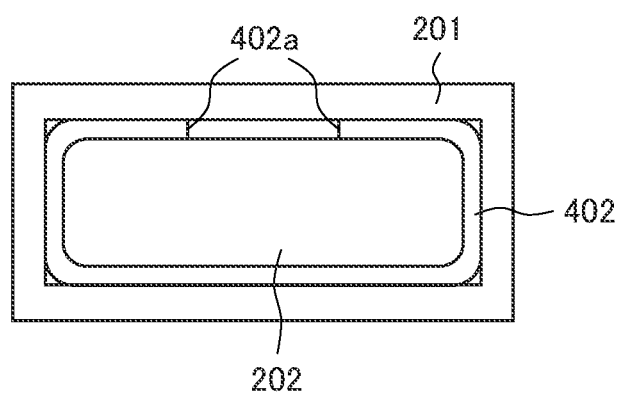
FIG. 4B is a plan view illustrating another example of the lower die and the resin leakage prevention member of FIGS. 3A and 3B.

FIGS. 4A and 4B are plan views illustrating a state in which the resin leakage prevention member 402 is disposed along the inner peripheral surface of the side member 201 as shown in FIG. 3A. In FIGS. 4A and 4B, the upper die 100, a substrate 10, and the resin material 20a are not shown. As shown in FIGS. 4A and 4B, by disposing the resin leakage prevention member 402 along the inner peripheral surface of the side member 201, the gap between the side member 201 and the bottom member 202 is sealed. The upper surface of the bottom member 202 except for the peripheral portion is not covered with the resin leakage prevention member 402. In FIGS. 4A and 4B, 402a shows a seam of the sheet-like resin leakage prevention member 402. FIG. 4A is an example in which the ends of the sheet-like resin leakage prevention member 402 form a seam (an example in which the number of the seam 402a is one), and FIG. 4B is an example in which the ends of the sheet-like resin leakage prevention member 402 are superposed to form seams (an example in which the number of the seam 402a is two or more). Alternatively, an additional sheet-like resin leakage prevention member having a size of covering the seam portion of the ends of the sheet-like resin leakage prevention member 402 with a predetermined width may be superposed on the seam portion (an example in which the number of the seam 402a is two or more). The seam 402a may be, for example, compressed or bonded with a tape, an adhesive, or the like so as not to form a gap.

The production method of a resin molded product using the molding die 1000 and the resin leakage prevention member 402 can be performed in the same manner as in Example 1 except that, for example, the resin leakage prevention member 402 is used instead of the resin leakage prevention member 401. As shown in the process cross-sectional view of FIGS. 3A and 3B, the resin leakage prevention member 402 is contractable between the substrate 10 and the bottom member 202 as in the case of the resin leakage prevention member 401.

Example 3

In the present example, yet another example of a resin molding apparatus and a production method of a resin molded product of the present invention will be described.

Figure 5A:
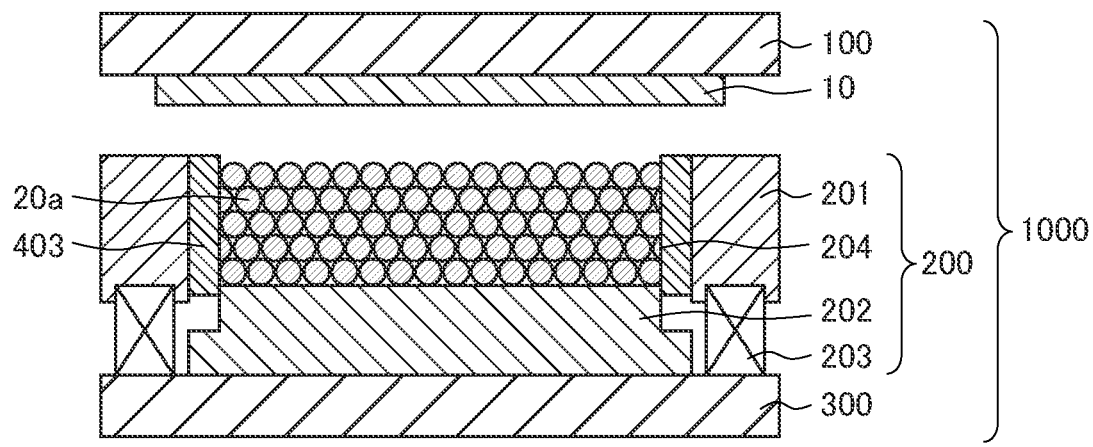
FIGS. 5A and 5B show process cross-sectional views illustrating yet another example of a resin leakage prevention member and a production method of a resin molded product using the same in a resin molding apparatus.
Figure 5B:
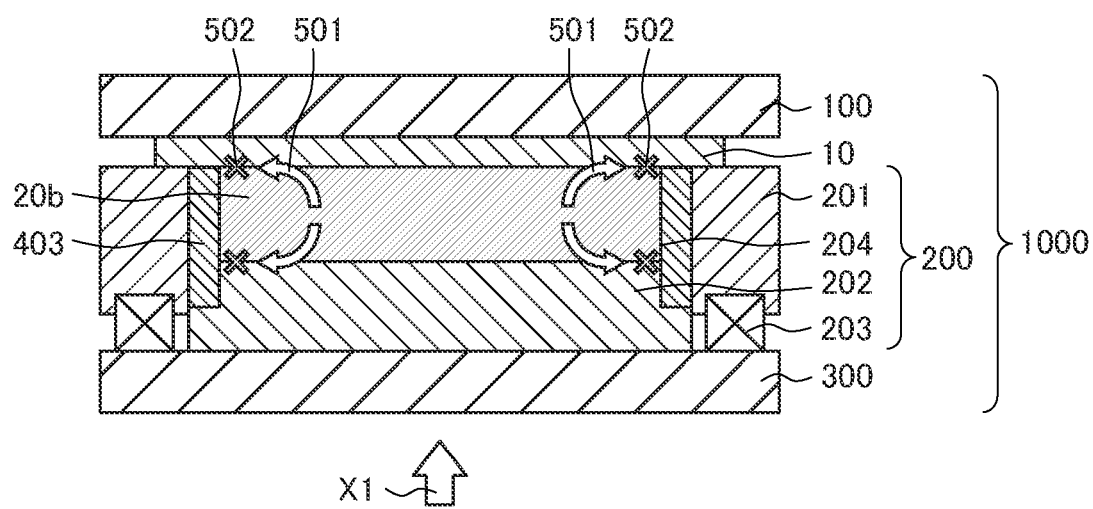

FIGS. 5A and 5B show process cross-sectional views illustrating an example of a resin leakage prevention member of the present invention and a production method of a resin molded product using the same in a resin molding apparatus. As shown in FIGS. 5A and 5B, the resin molding apparatus 1000 is the same as the resin molding apparatus 1000 of Examples 1 and 2, except that a recessed portion is formed in the peripheral portion of the upper end of the bottom member 202, and a resin leakage prevention member 403 is inserted into the recessed portion at the time of installing the resin leakage prevention member or clamping the die to use. That is, the resin leakage prevention member 403 is placed on the peripheral portion of the upper surface of the bottom member 202 and inserted into the recessed portion of the peripheral portion of the upper end of the bottom member 202. In FIGS. 5A and 5B, the resin leakage prevention member 403 uses the same sheet-like resin leakage prevention member as the sheet-like resin leakage prevention member 402 of Example 2. However, the resin leakage prevention member 403 is not limited thereto, and may be, for example, the same laminate as the resin leakage prevention member 401 of Example 1. The material of the resin leakage prevention member 403 is also not particularly limited, and may be, for example, the same as those of the resin leakage prevention member of Example 1 or 2.

The production method of a resin molded product using the molding die 1000 and the resin leakage prevention member 403 can be performed, for example, in the same manner as in Examples 1 and 2. As shown in the process cross-sectional view of FIGS. 5A and 5B, in the present example, the resin leakage prevention member 403 is configured to be lowered along the recessed portion of the peripheral portion of the upper end of the bottom member 202 instead of contracted between the substrate 10 and the bottom member 202.

As described above, the molding die for compression molding used in the present invention is not particularly limited, and may be the same as a general molding die for compression molding, and for example, as described in the present example, a recessed portion may be formed in the peripheral portion of the upper end of the bottom member, and the resin leakage prevention member may be inserted into the recessed portion.

Examples 1 to 3 have been described above, however, the present invention is not limited thereto. For example, two or more of the methods of Examples 1 to 3 may be used in combination.

Example 4

In the present example, an example of the entire configuration of a resin molding apparatus of the present invention and a production method of a resin molded product using the same will be described.

Figure 6:
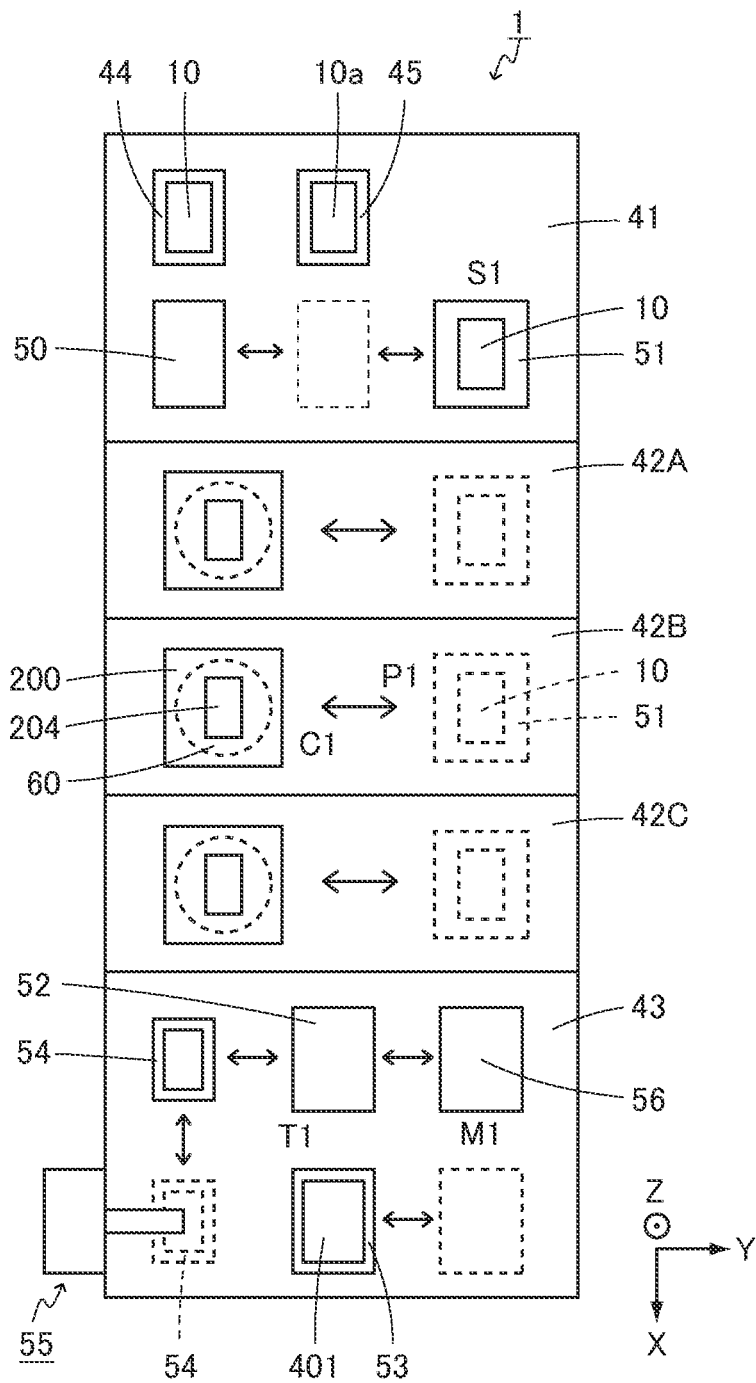
FIG. 6 is a plan view schematically illustrating the configuration of the entire resin molding apparatus of the present invention.

An example of the resin molding method using the resin molding apparatus 1 will be described with reference to FIG. 6. In the resin molding apparatus 1, a granular resin 20a (see FIGS. 1A, 3A and 5A) is used as a resin material. First, in a substrate supply/storage module 41, a substrate before encapsulation 10 (substrate 10, see FIGS. 1A, 1B, 3A, 3B, 5A, and 5B) is sent from a substrate before encapsulation supply unit 44 to a substrate placement unit 50. Next, a substrate conveying mechanism 51 is moved from a predetermined position S1 in the −Y direction to receive the substrate before encapsulation 10 from the substrate placement unit 50. The substrate conveying mechanism 51 is returned to the predetermined position S1. Next, the substrate conveying mechanism 51 is moved in the +X direction to a predetermined position P1 of the molding module 42B among three molding modules 42A to 42C provided in the resin molding apparatus 1, for example. Next, in the molding module 42B, the substrate conveying mechanism 51 is moved in the −Y direction and stopped at a predetermined position C1 on the lower die 200. Next, the substrate conveying mechanism 51 is elevated to fix the substrate before encapsulation 10 to the upper die 100. Then, the substrate conveying mechanism 51 is returned to the predetermined position S1 of a substrate supply/storage module 41.

The resin leakage prevention member 401 having a predetermined shape accommodated in the resin leakage prevention member supply mechanism 53 is then received by a material conveying mechanism 56, conveyed to the lower die 200 of the molding module 42B, and installed in the lower die 200. Here, the predetermined shape is a shape capable of covering the peripheral portion of the upper surface of the bottom member 202 and the entire side surface of the cavity 204 as shown in FIGS. 1A, 3A, and 5A. Regarding the resin leakage prevention member 401 according to Example 1, which is divided into a plurality of members, the plurality of members may be conveyed and installed one by one.

Next, the X-Y table 52 is moved from a predetermined position T1 in the −Y direction, and stopped at a predetermined position below a resin material accommodating frame 54. The resin material accommodating frame 54 is placed on the X-Y table 52. The X-Y table 52 on which the resin material accommodating frame 54 is placed is moved in the +X direction and stopped the resin material accommodating frame 54 at a predetermined position below a resin material supplying mechanism 55. By moving the X-Y table 52 in the X direction and the Y direction, a predetermined amount of the resin material 20a (see FIGS. 1A, 3A, and 5A) is supplied from the resin material supplying mechanism 55 to the resin material accommodating frame 54. The X-Y table 52 on which the resin material accommodating frame 54 is placed is returned to the predetermined position T1.

Next, the material conveying mechanism 56 is moved from a predetermined position M1 in the −Y-direction to receive the resin-material accommodating mechanism 54 placed on the X-Y table 52. The material conveying mechanism 56 is returned to the predetermined position M1. The material conveying mechanism 56 is then moved in the −X direction to the predetermined position P1 of the molding module 42B. Next, in the molding module 42B, the material conveying mechanism 56 is moved in the −Y direction and stopped at the predetermined position C1 on the lower die 200. The material conveying mechanism 56 is lowered to supply the resin material 20a into the cavity 204. After completion of supplying, the material conveying mechanism 56 is returned to the predetermined position M1.

Next, in the molding module 42B, the lower die 200 is elevated by a clamping mechanism 60, thereby clamping the upper die 100 and the lower die 200. After a predetermined time has elapsed, the upper die 100 and the lower die 200 are opened. Next, the substrate conveying mechanism 51 is moved from the predetermined position S1 of the substrate supply/storage module 41 to the predetermined position C1 on the lower die 200, and the encapsulated substrate (resin molded product) 10a is received. Next, the substrate conveying mechanism 51 is moved, and the encapsulated substrate 10a is passed to the substrate placement unit 50. The encapsulated substrate 10a is accommodated in an encapsulated substrate accommodating unit 45 from the substrate placement unit 50. At this stage, resin encapsulation (resin molding) is completed.

In the present example, three molding modules 42A, 42B, 42C are attached in the X direction between the substrate supply/storage module 41 and the material supply module 43. However, the number of the molding modules is not limited to three and can be any number. The substrate supply/storage module 41 and the material supply module 43 may be formed into one module, and the thus formed one module and the molding module 42A may be attached in the X direction. In this manner, the number of molding modules (42A, 42B, and so on) can be increased or decreased. Therefore, the configuration of the resin molding apparatus 1 can be optimized in accordance with the production mode and the production volume, so that the productivity can be improved.

In the present example, the resin leakage prevention member supply mechanism 53 for supplying the resin leakage prevention member 401 is provided in the material supply module 43. The present invention, however, is not limited thereto and the resin leakage prevention member supply mechanism 53 for supplying the resin leakage prevention member 401 may be not provided in the material supply module 43 but may be newly provided as a resin leakage prevention member supplying module. In this case, the resin leakage prevention member supply module may be attached between the molding module 42C and the material supply module 43 or next to the material supply module 43 remote from the molding module 42C. In this way, the resin molding apparatus 1 can be configured simply by adding the resin leakage prevention member supply module to a conventionally known apparatus.

In the present example, the resin leakage prevention member is illustrated as the resin leakage prevention member 401 of Example 1 (FIG. 1). However, the resin leakage prevention member is not limited thereto, and the resin leakage prevention member may be, for example, the resin leakage prevention member 402 of Example 2 (FIG. 3), the resin leakage prevention member 403 of Example 3 (FIG. 5), or the like.

The present disclosure of some examples can provide a resin leakage prevention member, a resin leakage prevention member supply mechanism, a resin molding apparatus, and a method for producing a resin molded product that is configured to prevent resin leakage without using a release film.

The present invention is not limited to the above described Examples. Various combination, changes, and selections may be made freely and appropriately in the configuration and specifics of the present invention without departing from the scope of the present invention. For example, while the object to be molded and the cavity are in the shape of a rectangle in the Examples described above, the present invention can be applied even if the object to be molded and the cavity are in the shape of a circle.

This application claims priority from Japanese Patent Application No. 2020-143050 filed on Aug. 26, 2020. The entire subject matter of the Japanese Patent Applications is incorporated herein by reference.

REFERENCE SIGNS LIST

1: resin molding apparatus
10: substrate before encapsulation (substrate)
10a: encapsulated substrate (resin molded product)
11: release film
20a: resin material
20b: molten resin
41: substrate supply/storage module
42A, 42B, 42C: molding module
43: material supply module
44: substrate before encapsulation supply unit
45: encapsulated substrate storage unit
50: substrate placement unit
51: substrate conveying mechanism
52: X-Y table
53: resin leakage prevention member supply mechanism
54: resin material accommodating mechanism
55: resin material supplying mechanism
56: material conveying mechanism
60: clamping mechanism
100: upper die
200: lower die
201: side member
202: bottom member
203: elastic member
204: cavity
300: lower die base member
401, 402, 403: resin leakage prevention member
501: arrow
502: X mark
1000: molding die
d: width of resin leakage prevention member

The invention claimed is:

1. A molding die for compression molding comprising:
a lower die, an upper die and a resin leakage prevention member, wherein
the lower die has a side member and a bottom member, a space surrounded by the side member and the bottom member forms a cavity,
the cavity is configured to accommodate a resin material,
the side member is configured to move relatively vertical to the bottom member, and
the resin leakage prevention member is disposed on a peripheral portion of the bottom member and along an inner peripheral surface of the side member, thereby sealing a gap between the side member and the bottom member and preventing the resin material from leaking from the cavity into the gap, and
divided into a plurality of members, and the plurality of members are stacked to use on the bottom member in a direction along the inner peripheral surface of the side member.

2. The molding die according to claim 1, wherein the resin leakage prevention member is formed of at least one material selected from the group consisting of paper, resins, and rubbers.

3. The molding die according to claim 1, wherein the resin leakage prevention member is formed of a contractable material.

4. The molding die according to claim 1, wherein the resin leakage prevention member is in a form of a sheet or a film.

5. The molding die according to claim 1, wherein a recessed portion is formed in a peripheral portion of an upper end of the bottom member, and the resin leakage prevention member is inserted into the recessed portion to use.

6. A resin molding apparatus, comprising:
a molding die according to claim 1.

7. The molding die according to claim 1, wherein the inner peripheral surface of the side member has at least a pair of side surfaces that are arranged to opposingly face each other and to extend relatively in a vertical direction with respect to a top surface of the bottom member,
an inner distance between the side surfaces of the side member in a horizontal direction, which is defined perpendicular to the vertical direction, is equal to or larger than a horizontal length of the bottom member, which is measured in the horizontal direction, such that the side member is allowed to move up and down in the vertical direction, and
the inner distance between the side surfaces of the side member is larger than a horizontal length of the top surface of bottom member, which is measured in the horizontal direction, such that the gap between side member and the bottom member is created.

8. The molding die according to claim 1, wherein the plurality of members each have an identical shape, and are stacked in a vertical direction with respect to a top surface of the bottom member such that a top of the plurality of members is flush with a top of the side member.

9. The molding die according to claim 1, wherein the resin leakage prevention member is in a shape having the same size as the cavity such that an outer peripheral portion of the resin leakage prevention member fits the inner peripheral surface of the side member, and
the resin leakage prevention member has a hollow thereinside with a predetermined width from the outer peripheral portion, the hollow penetrating through the resin leakage prevention member in a vertical direction with respect to a top surface of the bottom member such that the resin material is accommodated in the hollow of the resin leakage prevention member.

* * * * *